United States Patent
Ady et al.

(10) Patent No.: US 9,600,041 B2
(45) Date of Patent: Mar. 21, 2017

(54) HEAT MANAGEMENT APPARATUS FOR AN ELECTRONIC DEVICE

(71) Applicant: Google Technology Holdings LLC, Mountain View, CA (US)

(72) Inventors: Roger W. Ady, Chicago, IL (US); Alberto R. Cavallaro, Northbrook, IL (US); David Kyungtag Lim, Glenview, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 150 days.

(21) Appl. No.: 14/444,084

(22) Filed: Jul. 28, 2014

(65) Prior Publication Data

US 2016/0029512 A1    Jan. 28, 2016

(51) Int. Cl.
*H05K 7/20*    (2006.01)
*G06F 1/20*    (2006.01)

(52) U.S. Cl.
CPC .................................. *G06F 1/203* (2013.01)

(58) Field of Classification Search
CPC .... G06F 1/206; H01L 23/427; H05K 7/20436
See application file for complete search history.

(56) References Cited

U.S. PATENT DOCUMENTS

| | | | |
|---|---|---|---|
| 6,324,055 B1 * | 11/2001 | Kawabe | G06F 1/1616 361/679.54 |
| 6,912,785 B2 | 7/2005 | Mitchell | |
| 7,321,491 B2 * | 1/2008 | Long | G06F 1/203 165/104.33 |
| 9,127,898 B2 * | 9/2015 | Wong | G06F 1/20 |
| 9,268,376 B2 * | 2/2016 | Winkler | G06F 1/203 |
| 2013/0319640 A1 * | 12/2013 | Cavallaro | F28F 7/00 165/121 |
| 2014/0090990 A1 | 4/2014 | Richardson et al. | |
| 2014/0098489 A1 | 4/2014 | Chiriac et al. | |
| 2014/0110083 A1 | 4/2014 | Cheng | |
| 2014/0192480 A1 * | 7/2014 | Winkler | G06F 1/203 361/679.47 |

OTHER PUBLICATIONS

Joseph Menke: Quirky, https://www.quirky.com/joseph-menke, downloaded from internet: Jun. 23, 2014, all pages.

* cited by examiner

*Primary Examiner* — Robert J Hoffberg
*Assistant Examiner* — Hung Dang
(74) *Attorney, Agent, or Firm* — Faegre Baker Daniels LLP

(57) ABSTRACT

A heat management apparatus for an electronic device that includes a heat spreader. The heat spreader has a top surface and a bottom surface. A first portion is coupled to the electronic device. A second portion extends away from the electronic device. The heat spreader has a heat conductivity of at least approximately 100 Watts per meter Kelvin (W/mK). In some configurations the heat spreader may comprise a woven graphite material or a graphene material with a heat conductivity of at least approximately 1000 W/mK.

13 Claims, 6 Drawing Sheets

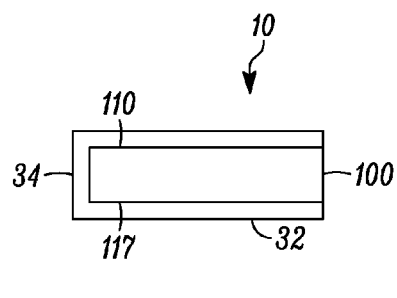
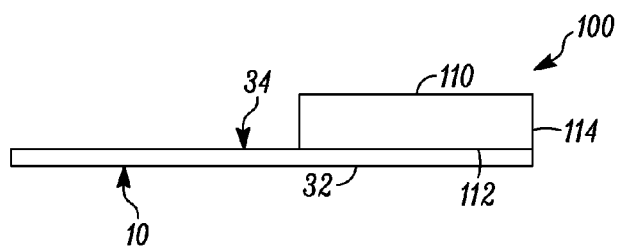
*FIG. 5A*  *FIG. 5B*
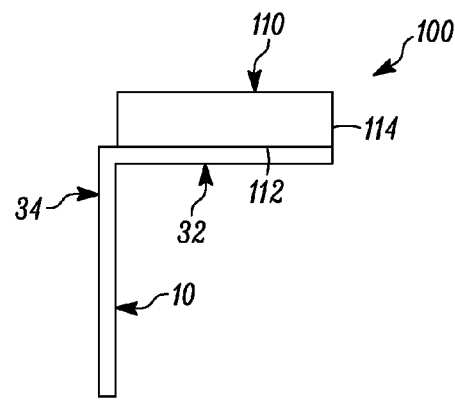
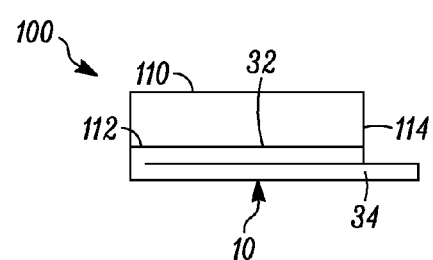
*FIG. 5C*  *FIG. 5D*

HEAT MANAGEMENT APPARATUS FOR AN ELECTRONIC DEVICE

CROSS-REFERERENCE TO RELATED APPLICATION

N/A

BACKGROUND OF THE DISCLOSURE

1. Field of the Disclosure

The disclosure relates in general to electronic devices, and more particularly, to a heat management apparatus for an electronic device. The electronic device, it will be understood, will be disclosed as a mobile phone. However, it will also be understood that the electronic device may comprise a tablet, a hand held gaming device, an audio device, a remote control, among others.

2. Background Art

With increasing power in electronic devices, an undesirable side effect has been the increasing generation of heat within such devices. At the same time, the devices are becoming smaller. As such, thermal management is becoming an issue with many electronic devices, including, but not limited to mobile phones and tablets. Not only is heat generation increasing, but the smaller size of the devices limits the surface area for the dissipating of heat to the surrounding environment. In many instances, devices must be shut down, or at least partially detuned as they warm up toward the point of permanent damage.

Problematically, different cooling methods and structures have drawbacks. For example, increasing the size of the device so as to have a greater surface area for the dissipation of heat, or providing fins and the like renders the device difficult to carry and handle. Other solutions increase the circulation of air through the device through the inclusion of ports to improve the airflow passively. Problematically, such ports can fill with dust and liquids. Where active systems are utilized for increasing the airflow, such inclusion adds wear-prone components. Further, such active systems increase the power drain of the electronic device.

SUMMARY OF THE DISCLOSURE

The disclosure is directed to a heat management apparatus for an electronic device. The heat management apparatus includes a heat spreader. The heat spreader has a top surface and a bottom surface opposite the top surface. A first portion of the heat spreader is coupled to the electronic device. A second portion of the heat spreader extends away from the electronic device. The heat spreader has a heat conductivity of at least approximately 100 Watts per meter Kelvin (W/mK).

In some configurations, the first portion of the heat spreader is coupled to an outer body of the electronic device.

In some configurations, the first portion of the heat spreader is coupled to a removable portion of the outer body of the electronic device.

In some configurations, the first portion of the heat spreader is coupled to a bottom surface of the outer body of the electronic device.

In some configurations, the second portion of the electronic device is flexible and configured to extend over adjoining surfaces of the outer body of the electronic device.

In some configurations, the first portion of the heat spreader is coupled to the bottom surface of the outer body of the electronic device. The second portion of the heat spreader is selectively positionable in a plurality of orientations. At least one of the orientations extends the second portion over a top surface of the electronic device.

In some configurations, the second portion of the heat spreader further includes at least one feature of separate utility.

In some configurations, the at least one feature of separate utility is selected from the group consisting of a slot, a loop configured to receive a stylus or writing implement, and an input device.

In some configurations, the at least one feature of separate utility includes a plurality of fold lines positioned on the second portion of the heat spreader. The plurality of fold lines cooperate with the second portion of the heat spreader to form a stand for the electronic device.

In some configurations, the first portion of the heat spreader is positioned within the electronic device. The electronic device has a body opening through which the heat spreader extends to the second portion thereof.

In some configurations, the heat spreader is positioned in close proximity to an inner heat generating element.

In some configurations, the heat spreader further includes one of a heat conductive pad and a heat conductive paste extending between an inner heat generating element and the first portion of the heat spreader.

In some configurations, the first portion of heat spreader and the second portion of the heat spreader are releasably attachable to each other at a coupling. In some configurations, the coupling comprises a magnetic coupling.

In some configurations, the heat spreader has a heat conductivity of at least approximately 1000 Watts per meter Kelvin (W/mK).

In some configurations, the heat spreader is one of a woven carbon fiber material and a graphene material. Of course, other materials are contemplated.

In some configurations, a protective coating extends over at least a part of the second portion of the heat spreader.

In another aspect of the disclosure, the disclosure is directed to a combination electronic device and heat management apparatus. The electronic device includes an outer body and at least one inner heat generating element. The heat management apparatus includes a heat spreader that has a top surface and a bottom surface opposite the top surface. A first portion of the heat spreader is coupled to the electronic device and the second portion extends away from the electronic device. The heat spreader has a heat conductivity of at least approximately 100 Watts per meter Kelvin (W/mK).

In some configurations, the first portion of the heat spreader extends into the outer body of the electronic device and is positioned in close proximity to the at least one inner heat generating element. The electronic device further includes a body opening through which the heat spreader extends to the second portion.

In some configurations, the first portion is coupled to a bottom surface of the outer body of the electronic device.

BRIEF DESCRIPTION OF THE DRAWINGS

The disclosure will now be described with reference to the drawings wherein:

FIGS. 5a through 5d of the drawings are side elevational views of a configuration of the heat management apparatus that is attached to an electronic device as is shown in FIG. 1, with the second portion of the heat spreader being positioned in a number of different orientations relative to the first portion of the heat spreader;

DETAILED DESCRIPTION OF THE DISCLOSURE

Figure 1:
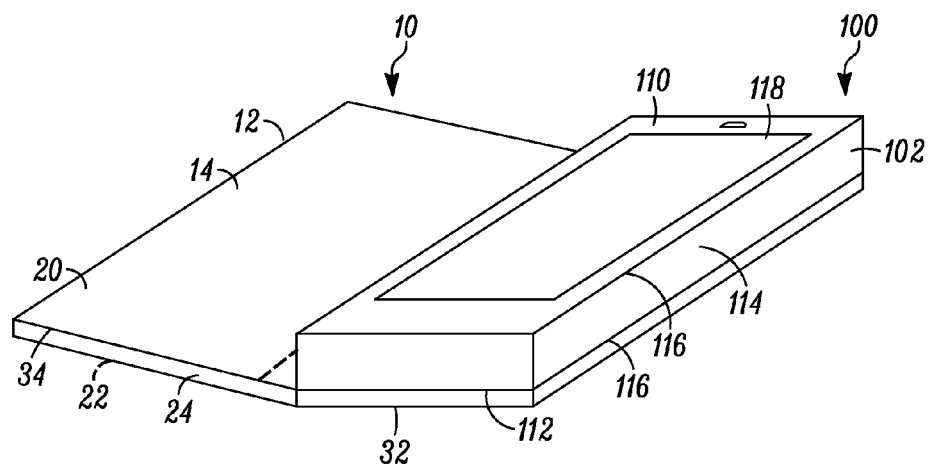
FIG. 1 of the drawings is a perspective view of a configuration of the heat management apparatus shown as being attached to an electronic device.

While this invention is susceptible of embodiment in many different forms, there is shown in the drawings and described herein in detail a specific embodiment with the understanding that the present disclosure is to be considered as an exemplification and is not intended to be limited to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
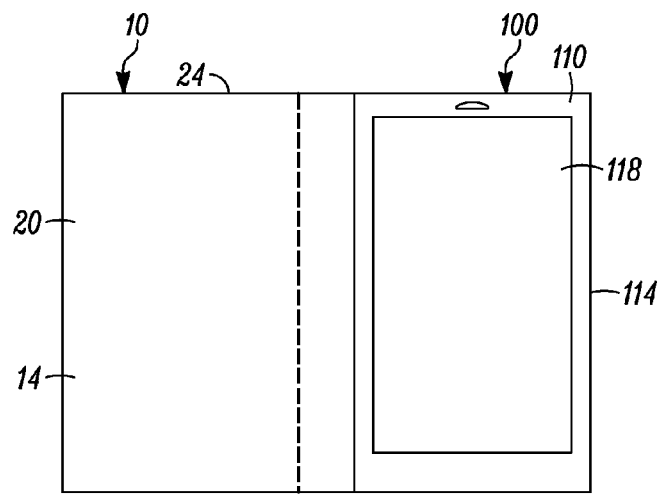
FIG. 2 of the drawings is a top plan view of the configuration of the heat management apparatus that is attached to an electronic device as is shown in FIG. 1.
Figure 3:
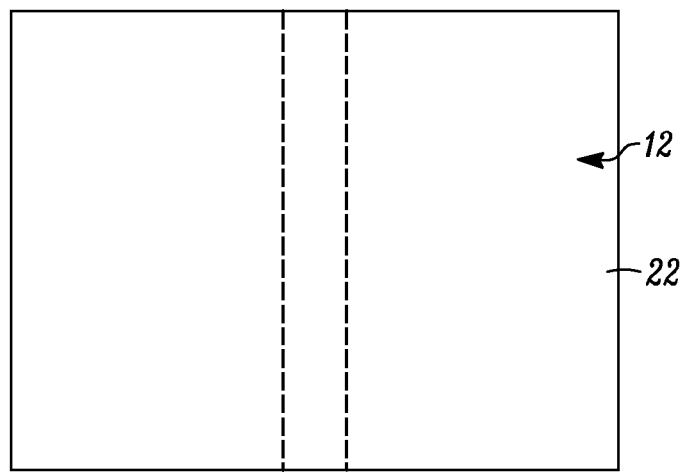
FIG. 3 of the drawings is a back plan view of the configuration of the heat management apparatus that is attached to an electronic device as is shown in FIG. 1.
Figure 4:
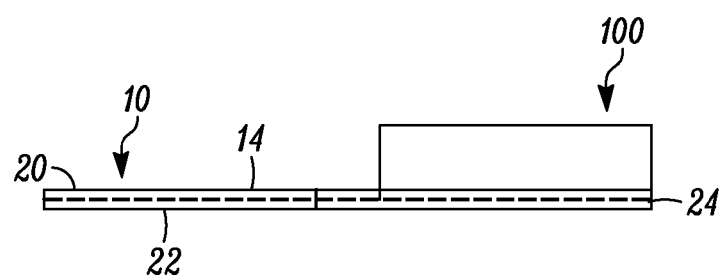
FIG. 4 of the drawings is a side elevational view of the configuration of the heat management apparatus that is attached to an electronic device as is shown in FIG. 1.

Referring now to the drawings and in particular to FIGS. 1 through 3, the heat management apparatus is shown generally at 10. The heat management apparatus 10 is configured for use and integration with electronic device 100. The electronic device, as set forth above may comprise any number of electronic devices, including but not limited to, a mobile phone, a tablet, a hand held gaming device, an audio device, remote controls among others. Where the particular embodiment is shown as being a mobile phone, it will be understood that it is not limited thereto.

Figure 6:
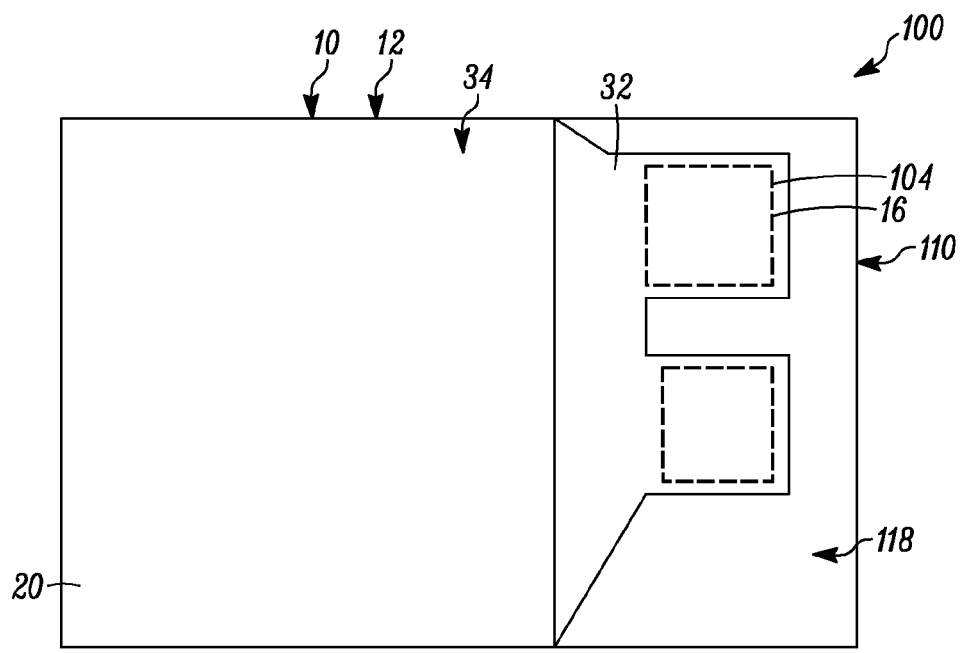
FIG. 6 of the drawings is a bottom plan view of another configuration of the heat management apparatus shown as being attached to an electronic device, with the first portion thereof extending into the electronic device and being positioned in close proximity with an inner heat generating element of the electronic device.
Figure 7:
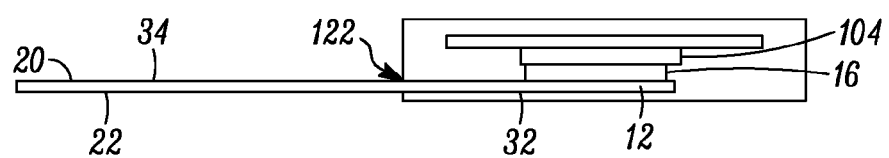
FIG. 7 of the drawings is a cross-sectional view of the configuration of FIG. 6, showing, in particular, the attachment of the heat spreader to a heat conductive pad which is coupled to an inner heat generating element.

The electronic device 100 is shown as comprising outer body 102 and inner heat generating elements 104 (FIGS. 6 and 7). The outer body 102 is typically formed from one or more components that are typically formed from a polymer, a composite, metal, and/or glass. The outer body 102 typically includes a top surface 110, a bottom surface 112, a plurality of side surfaces 114. A display 118 may be positioned on one of the surfaces (in some devices, as set forth below, a display may not be presented on one of the surfaces when the device is in a closed configuration.

It will be understood that in certain embodiments, the number of the surfaces may blend together. For example, an electronic device may have a curved bottom surface such that the bottom surface extends to the top surface and there are essentially no side surfaces. In other embodiments, some of the side surfaces may be omitted. In still other embodiments, additional surfaces may be provided. For example, some devices may be hinged in which case a first set of surfaces are defined in a closed orientation with a second set of surfaces defined when in an open orientation. As another example, some devices may have portions that can slidably move relative to other portions, to, for example, expose a keyboard, input device, or display device. The disclosure is not limited to any particular configuration, and the foregoing configurations are all within the scope of the disclosure, as are other configurations which are not specifically disclosed.

In many instances, as the outer body is formed from a plurality of elements, the elements meet or otherwise are joined at a body joint, such as body joint 116. The body joint represents a location wherein different panels meet and wherein a seam or the like is formed. In some embodiments, multiple such joints can be found between the different surfaces, whereas in other embodiments, many of the surfaces may not include any such seams or joints. It will also be understood that removable components may form a portion of some of the surfaces, or portions of multiple surfaces. For example, a battery door which is removable (and provides access to the battery) may be disposed on one or more of the surfaces of the device, or may comprise the entirety of one of the surfaces (i.e., the bottom surface).

The electronic device 100 includes a plurality of heat generating elements 104 as is shown in FIGS. 6 and 7, including but not limited to integrated circuits, processors, transistors, capacitors, power transformers, resistors, and the like. The particular number of and the particular heat load of each such component can be varied depending on the type and size of the electronic device. However, as such electronic devices become more powerful and smaller in size, it is increasingly difficult to dissipate the heat generated by the components through the outer body of the case or through other components within the electronic device (i.e., the battery), or both.

The heat management apparatus 10 is shown in FIGS. 1 through 4 and 5a through 5d as being coupled to the electronic device 100, and in particular to the outer body 102 of the electronic device. Of course, the apparatus is not limited to such a configuration, and other embodiments, below, describe alternate configurations of the heat management apparatus.

The heat management apparatus in the configuration of FIG. 1 is shown as comprising heat spreader 12, protective coating 14 and heat conductive pad 16. The heat spreader 12 is shown as being a flexible material positionable into a planar configuration having a top surface 20, a bottom surface 22 and an outer perimeter 24. In the configuration shown, the heat spreader includes a first portion 32 coupled to the outer body 102, and a second portion 34 which extends beyond the footprint of the body. The heat spreader acts much like a fin to direct heat away from the inner heat generating elements as well as away from the outer body of the electronic device.

In the embodiment shown, the heat spreader is sized so that the first portion 32 is coupled to the outer body and the second portion 34 is able to be wrapped around a plurality of surfaces of the electronic device so as to overlay these surfaces. The material is flexible so as to be able to closely follow the contours of the electronic device (which is useful where the contours of the electronic device are curved or non-uniform. Among other materials, a woven graphite material is contemplated. The woven graphite material provides a desirable flexibility for the heat spreader to allow for the heat spreader to follow the contours of the electronic device. In other embodiments, a graphene sheet is contemplated, due to its properties of heat conduction and flexibility. Other materials, including woven metals, metal materials, and the like are contemplated for use. While a number of different materials are contemplated, it is contemplated that the conductivity of the heat spreader be on the order of at least approximately 100 Watts per meter Kelvin (W/mK). More preferably, the conductivity of the heat spreader is on the order of at least approximately 1000 W/mK.

As will be understood, it is preferred that the heat spreader be covered with a protective coating 14 which protects the material from cuts, scrapes and other problems, or that protects the user from the material. In the embodiment shown, the protective coating comprises a coating or cover that can be applied to the underlying material so as to substantially encapsulate the same, such as, for example, PET, polycarbonate and/or leather. It will be understood that, in certain embodiments, it may be desirable to omit the protective coating with the portion of the heat spreader that is directly attached to the body, i.e., the first portion 32, and generally not movable.

With reference to FIGS. 5a through 5d, it will be understood that the second portion 34 of the heat spreader 12 can be selectively positionable into a number of configurations relative to the electronic device. For example, the first portion 32, or a portion thereof, may be affixed to the bottom surface such that intimate contact is achieved for purposes of allowing maximum heat transfer therebetween. It will be understood that heat conductive pad 16 (FIG. 7) or conductive adhesive can be used to insure the adequate transfer of heat therebetween.

The heat spreader, however is larger than the bottom surface, and thus, the second portion 34 extends beyond the edge of the bottom surface. In the configuration shown, the heat spreader extends beyond only one of the sides of the electronic device. With reference to FIG. 5(a), the heat spreader is shown with the second portion 34 extending beyond the bottom surface being wrapped around a side surface and then overlying the top surface.

It will also be understood that the protective cover may be larger or smaller than the heat spreader. As such, in some configurations, portions of the heat spreader may stick beyond the protective coating. In other configurations, the protective coating may extend beyond the configuration of the heat spreader. As such, the configuration of the protective coating may not match the configuration of the heat spreader. Additionally, where certain structures of additional separate utility are provided, the heat spreader may extend around these structures and remain away from these structures, so as to limit the head dissipation in and around such structures of additional utility (especially where heat may be damaging to the operation of the same).

With reference to FIG. 5(b), the second portion of the heat spreader can be rotated away from the top surface and moved from the side surface. In such a configuration, a portion of the heat spreader is positioned in a direction away from the electronic device. Such a configuration could be, for example, seen when the device is positioned on a table or other surface, with the top surface being exposed and visible (i.e., the top surface including a display or the like).

With reference to FIG. 5(c), the second portion 34 of the heat spreader can be further rotated such that it is in a downward direction again away from the electronic device but at an angle (such as, for example 90°) relative to the first portion 32 of the heat spreader that overlies the bottom surface. Such a configuration could be seen when a user is holding the device. It will be understood that the portion of the heat spreader that extends from the electronic device may flap or otherwise flexibly move relative to the electronic device, and relative to the portion which is overlyingly coupled to the electronic device.

With reference to FIG. 5(d), a configuration is shown wherein the second portion of the heat spreader is folded over itself so that the portion of the second portion heat spreader that extends beyond the bottom surface is positioned to overlie the bottom surface.

In such a configuration, the portions of the spreader are separated by the protective coating or any other material positioned thereover.

Figure 8:
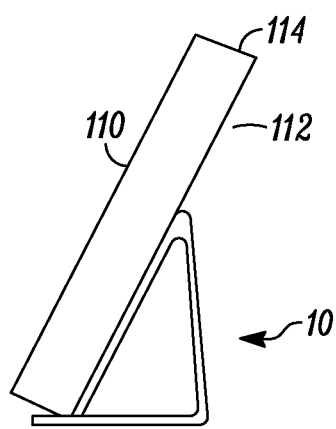
FIG. 8 of the drawings is a side elevational view of a configuration of the heat management apparatus that is attached to an electronic device wherein the heat spreader has additional utility as a stand for the electronic device.

It will be understood that in the foregoing configuration of FIGS. 1 through 5, the heat spreader may have a number of different configurations and shapes. For example, the first portion of the heat spreader may cover the entirety of the bottom surface, or a portion thereof. The second portion of the heat spreader that extends away from the electronic device may be positionable to cover the entirety or a portion of the top surface of the outer body. Additionally, it is contemplated that the heat spreader may include one or more crease or fold lines which may be defined (i.e., either through scoring, the thickness of the protective coating, locally, among others). The definition of desired folding orientations may allow for the particular folding of the heat spreader into configurations which provide separate additional utility. For example, and with reference to FIG. 8 the particular fold pattern may yield a stand upon which the electronic device may be rested for viewing. In other configurations, the particular fold pattern may yield a configuration which is suitable for the receipt of an outside object, such as, for example, a pen, a note card or the like.

Figure 9:
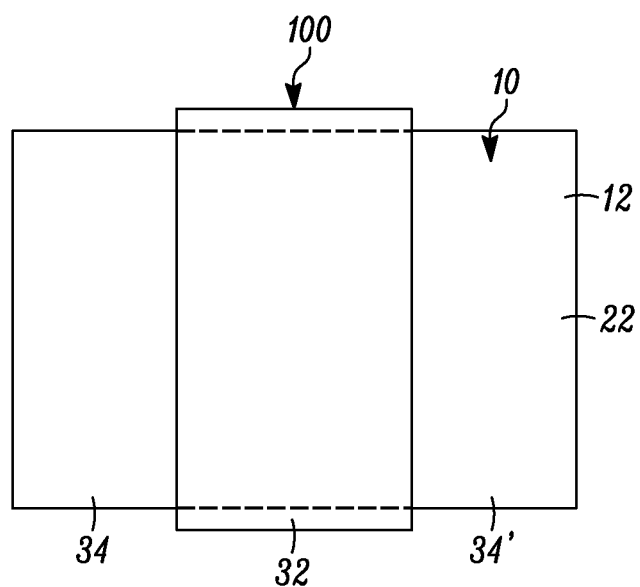
FIG. 9 of the drawings is a back plan view of a configuration of the heat management apparatus that is attached to an electronic device wherein the second portion extends beyond opposing sides of the electronic device, and wherein each second portion component can be extended over a side surface and over at least a portion of the top surface of the electronic device.

In other configurations, such as the configuration of FIG. 9, the heat spreader may extend from the electronic device in multiple directions. In one configuration, the heat spreader may extend on opposing sides of the bottom surface, so as to create two separate second portions 34, 34'. In operation, each of the second portions 34, 34' of the heat spreader that extend may be rotated to overlie the top surface of the electronic device. In some configurations, the opposing portions of the heat spreader may overlap each other, whereas in other embodiments, they may meet on the top surface of the electronic device without overlapping.

In addition, it will be understood that in the place of the protective coating, or on the protective coating, other separate utility may be provided to the heat management apparatus. A loop 43 may be provided that can accept and retain a writing implement or stylus. Additionally, an input device 45 such as a trackpad or a keyboard, each coupled wirelessly to the electronic device may be disposed on the heat spreader. Additionally, a plurality of slots 41 may be disposed thereon to be able to retain a credit card, a business card or an identification.

It will be understood that where the heat spreader is coupled to a portion of the outer body that is removable (such as a battery cover), it may be possible to separate the heat spreader from the rest of the electronic device. In addition, a separate battery cover may be provided that does not include the heat spreader, such that the user can selectively choose to carry the electronic device with a battery cover solely, or with a battery cover that has the heat spreader coupled thereto.

In the configuration of FIGS. 6 and 7, the heat management apparatus may include a portion that is positioned within the outer body 102. For example, the first portion 32 of the heat spreader may be positioned within the outer body and proximate to one or more heat generating elements 104. In such a configuration, a heat conductive pad (or paste) 16 can be used to couple the first portion of the heat spreader directly to one or more heat generating elements. The heat spreader can extend toward the outer body and through an opening 122 in the outer body configured for the heat spreader. In the embodiment shown, the heat spreader extends out of an opening 122 on one of the side surfaces of the outer body. In certain embodiments, the opening may correspond to a body joint component wherein two separate components of the outer body meet.

The second portion 34 of the heat spreader that extends from the outer body 102 is flexible and can be positioned into a number of different configurations. For example, the second portion of the heat spreader that extends from the outer body can be rotated and positioned to overlie the top surface of the electronic device, or the bottom surface of the electronic device. In other embodiments, the second portion of the heat spreader that extends from the outer body can be positioned so as to be free of contact with the outer body.

Figure 11:
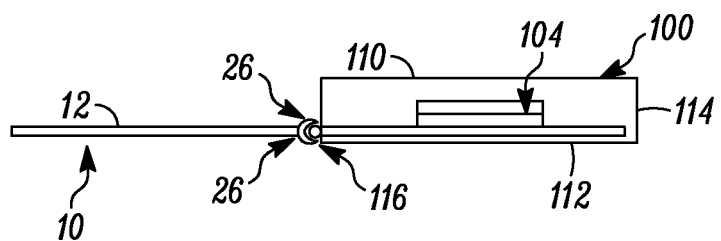
FIG. 11 of the drawings is a cross-sectional view of a configuration of the heat management apparatus that is attached to an electronic device wherein the second portion of the heat spreader is couplable to the first portion of the heat spreader through a releasable coupling, with the first portion of the heat spreader extending into the electronic device.

It will be understood that the first portion 32 of the heat spreader in the embodiment of FIGS. 7 and 11 may be configured to be insertable into the electronic device through the opening 122 and removable therefrom as well. In addition, while the inner heat generating elements are shown to be on one side of the heat spreader, it will be understood that the inner heat generating elements may be positioned on either side of the heat spreader. Furthermore, it is contemplated that the first portion 32 of the heat spreader may include multiple components, some of which are removably insertable into the electronic device to matingly engage (or closely abut) another component of the first portion that are configured to remain within the electronic device.

In yet another configuration, and with reference to FIG. 11, the heat spreader may comprise multiple components that are coupled together through a heat conducting coupling. For example, and with reference to FIG. 11, the heat spreader may have first component 32 which extends from the inner heat generating elements 104 and extends to the outer body 102, terminating at a coupling 26. The coupling may comprise a magnetic structure, or a hinge structure. It will be understood that in certain embodiments, the coupling may be integrated into the outer body and may comprise magnets, or a surface which is in close proximity to a magnet positioned within the outer body. As such, the user can selectively couple and decouple the second portion of the heat spreader from the first portion.

The second component 34 of the heat spreader may include a mating coupling 26' which can be releasably attached to the coupling of the first component 32 of the heat spreader. In such an embodiment, the coupling structures comprise a heat conductive structure having a heat conduction of at least 100 W/mK. For example, the coupling structure may comprise a metal member, a magnetic structure (which may comprise a metal). It is contemplated that the coupling structure allows for the rotative movement of the two components relative to each other.

In some configurations, such as the configuration of FIG. 9, the two second portions 34, 34' may each comprise (or only one may comprise) a detachable second component. For example, either one of second portion 34 and second portion 34' may be detachable from the first portion 32 through the coupling structures 26, 26'.

Figure 10:
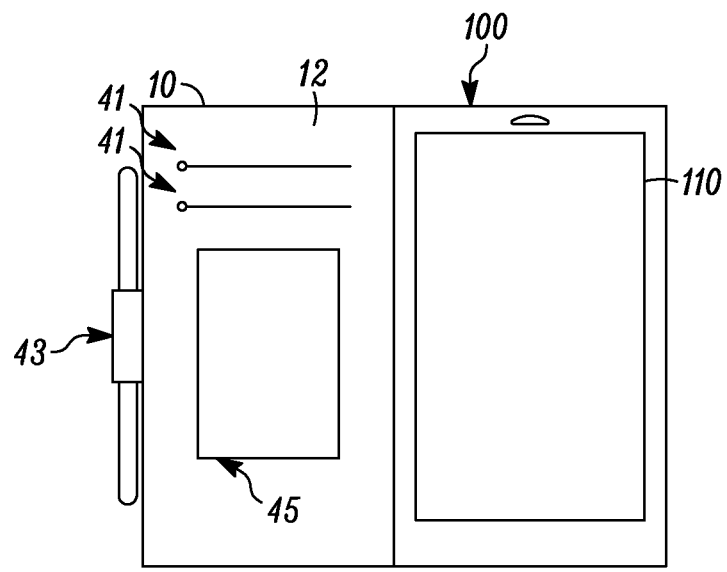
FIG. 10 of the drawings is a top plan view of a configuration of the heat management apparatus that is attached to an electronic device wherein the second portion includes a plurality of slots for receiving credit cards, identification cards, business cards or notes, a loop for retaining a pen or stylus, and a input device, such as a trackpad with wireless communication.

It is likewise contemplated that various combinations of features may be utilized. For example, a detachable second portion may include the slots, loop and/or input device of the configuration of FIG. 10. Additionally, the detachable second portion may include configurations which provide additional utility, such as to function as a stand for viewing the device in, for example, the configuration of FIG. 8.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A heat management apparatus for an electronic device comprising:
   a heat spreader having a top surface and a bottom surface opposite the top surface, and including a first portion coupled to the electronic device and a second portion comprising a planar configuration extending away from the electronic device, wherein the second portion of the heat spreader is flexible and configured to extend over adjoining surfaces of an outer body of the electronic device,
   wherein the heat spreader has a heat conductivity of at least approximately 100 Watts per meter Kelvin (W/mK); and
   wherein the first portion of the heat spreader is positioned within the electronic device, with the electronic device having a body opening through which the heat spreader extends to the second portion comprising the planar configuration thereof.

2. The heat management apparatus of claim 1 wherein the second portion of the heat spreader being selectively positionable in a plurality of orientations, at least one of which orientations extends the second portion over a top surface of the electronic device.

3. The heat management apparatus of claim 1 wherein the second portion of the heat spreader further includes at least one feature of separate utility.

4. The heat management apparatus of claim 1 wherein the heat spreader is positioned in close proximity to an inner heat generating element.

5. The heat management apparatus of claim 4 further comprising one of a heat conductive pad and a heat conductive paste extending between an inner heat generating element and the first portion of the heat spreader.

6. The heat management apparatus of claim 1 wherein the first portion of heat spreader and the second portion of the heat spreader are releasably attachable to each other at a coupling.

7. The heat management apparatus of claim 6 wherein the coupling comprises a magnetic coupling.

8. The heat management apparatus of claim 1 wherein the heat spreader has a heat conductivity of at least approximately 1000 Watts per meter Kelvin (W/mK).

9. The heat management apparatus of claim 8 wherein the heat spreader comprises one of a woven carbon fiber material and a graphene material.

10. The heat management apparatus of claim 1 further comprising a protective coating extending over at least a part of the second portion of the heat spreader.

11. A combination electronic device and heat management apparatus, the electronic device comprising:
  an outer body and at least one inner heat generating element;
  the heat management apparatus further comprising:
  a heat spreader having a top surface and a bottom surface opposite the top surface, and including a first portion coupled to the electronic device and a second portion comprising a planar configuration extending away from the electronic device, wherein the second portion of the heat spreader is flexible and configured to extend over adjoining surfaces of an outer body of the electronic device,
  wherein the heat spreader has a heat conductivity of at least approximately 100 Watts per meter Kelvin (W/mK); and
  wherein the first portion of the heat spreader extends into the outer body of the electronic device and is positioned in close proximity to the at least one inner heat generating element, with the electronic device further including a body opening through which the heat spreader extends to the second portion comprising the planar configuration.

12. A heat management apparatus for an electronic device comprising:
  a heat spreader having a top surface and a bottom surface opposite the top surface, and including a first portion coupled to the electronic device and a second portion comprising a planar configuration extending away from the electronic device,
  wherein the heat spreader has a heat conductivity of at least approximately 100 Watts per meter Kelvin (W/mK);
  wherein the first portion of the heat spreader is positioned within the electronic device, with the electronic device having a body opening through which the heat spreader extends to the second portion comprising the planar configuration thereof;
  wherein the second portion of the heat spreader further includes at least one feature of separate utility; and
  wherein the at least one feature of separate utility is selected from the group consisting of a slot, a loop configured to receive a stylus or writing implement, and an input device.

13. A heat management apparatus for an electronic device comprising:
  a heat spreader having a top surface and a bottom surface opposite the top surface, and including a first portion coupled to the electronic device and a second portion comprising a planar configuration extending away from the electronic device,
  wherein the heat spreader has a heat conductivity of at least approximately 100 Watts per meter Kelvin (W/mK);
  wherein the first portion of the heat spreader is positioned within the electronic device, with the electronic device having a body opening through which the heat spreader extends to the second portion comprising the planar configuration thereof;
  wherein the second portion of the heat spreader further includes at least one feature of separate utility; and
  wherein the at least one feature of separate utility includes a plurality of fold lines positioned on the second portion of the heat spreader, the plurality of fold lines cooperating with the second portion of the heat spreader to form a stand for the electronic device.

* * * * *